(12) United States Patent
Sander et al.

(10) Patent No.: US 8,135,244 B1
(45) Date of Patent: Mar. 13, 2012

(54) REAL TIME MEASUREMENT OF SHOCK PRESSURE

(75) Inventors: Robert K. Sander, Buena Vista, CO (US); Kirill K. Zhuravlev, Monrovia, CA (US); Richard D. Schaller, Santa Fe, NM (US); Jeffrey M. Pietryga, Los Alamos, NM (US); Michael Whitehead, Los Alamos, NM (US)

(73) Assignee: The United States of America as represented by the United States Deparment of Energy, Washington, DC (US)

( * ) Notice: Subject to any disclaimer, the term of this patent is extended or adjusted under 35 U.S.C. 154(b) by 1033 days.

(21) Appl. No.: 11/939,580

(22) Filed: Nov. 14, 2007

(51) Int. Cl.
*G02B 6/00* (2006.01)
(52) U.S. Cl. .................. 385/12; 385/13; 250/227.18
(58) Field of Classification Search .................. None
See application file for complete search history.

(56) References Cited

U.S. PATENT DOCUMENTS

| | | | | |
|---|---|---|---|---|
| 5,293,046 A * | 3/1994 | Wheatley | ............... | 250/458.1 |
| 5,446,286 A * | 8/1995 | Bhargava | ............... | 250/361 R |
| 5,881,200 A * | 3/1999 | Burt | ............... | 385/142 |
| 6,756,579 B2* | 6/2004 | Pangilinan et al. | ...... | 250/227.14 |
| 7,019,333 B1* | 3/2006 | Shields et al. | ............... | 257/97 |
| 2002/0186921 A1* | 12/2002 | Schumacher et al. | .......... | 385/31 |
| 2005/0111805 A1* | 5/2005 | Hertz et al. | ............... | 385/125 |
| 2007/0127877 A1* | 6/2007 | Simonneau et al. | .......... | 385/123 |
| 2009/0022491 A1* | 1/2009 | Takemoto | ............... | 398/34 |
| 2010/0108870 A1* | 5/2010 | Kramer et al. | ............ | 250/231.19 |

OTHER PUBLICATIONS

R.W. Meulenberg et al. Pressure-induced electronic coupling in CdSe semiconductor quantum dots. Physical Review B 66, 035317, Jul. 2002.*
K.K. Zhuravlev et al. Optical properties of PbSe nanocrystal quantum dots under pressure. Applied Physics Letters 90, 043110, Jan. 2007.*
C.B. Murray et al., Colloidal synthesis of nanocrystals and nanocrystal superlattices, IBM J. Res. Dev. 45, 47-56 (2001).
J.M. Pietryga et al., Pushing the Band Gap Envelope: Mid-Infrared Emitting Colloidal PbSe Quantum Dots, Am. Chem. Soc. 126. 11752-11753 (2004).
A.P. Alivisatos et al., Resonance Raman scattering and optical absorption studies of CdSe microclusters at high pressure, J. Chem. Phys. 89, 5979 (1988).
J. Li et al., Deformation potentials of CdSe quantum dots, Appl. Phys. Lett. 85, 2929 (2004).
Al.L. Efros et al., Interband absorption of light in a semiconductor sphere, Sov. Phys. Semicond. 16, 772 (1982).
F.W. Wise et al., Lead Salt Quantum Dots: the Limit of Strong Quantum Confinement. Acc. Chem. Res. 33, 773 (2000).
B. L. Wehrenberg et el., Interband and Intraband Optical Studies of PbSe Colloidal Quantum Dots. J. Phys. Chem. B 106.10634-10640 (2002).
R.D. Schaller et al., Tunable Near-Infrared Optical Gain and Amplified Spontaneous Emission Using PbSe Nanocrystals, J. Phys. Chem. B 107, 13765 (2003).

(Continued)

*Primary Examiner* — Mike Stahl
(74) *Attorney, Agent, or Firm* — Thomas S. O'Dwyer; James C. Durkis; John T. Lucas (57) ABSTRACT

A fiber-based optical pressure-sensor, made using semiconductor nanocrystal quantum dots (NQDs) as the active transducing material, provides response time fast enough for shock wave measurements. For NQDs, the shift in band gap as a result of applied pressure can be observed as a shift of the photoluminescence (PL) peak. Further, the shift of the principal absorbance feature allows pressure measurements faster than those obtainable by following the PL peak.

32 Claims, 5 Drawing Sheets

OTHER PUBLICATIONS

S.V. Ovsyannikov et el., Thermomagnetic and thermoelectric properties of semiconductors (PbTe.PbSe) at ultrahigh pressures, Physics B 344, 190 (2004).

S.V. Ovsyannikov et al., Semiconductor-metal transitions in lead chalcogenides at high pressure, Phys. Stat. Sci. B 235, 521 (2003).

A. Jayaraman, Diamond anvil cell and high-pressure physical investigations, Rev. Mod. Phys. 55, 65 (1983).

D. Schiferl, Temperature compensated high-temperature/high-pressure Merrill-Bassett diamond anvil cell, Rev. Sci. Instr. 58, 1316 (1987).

D.Rached et al., Calculated band structures and optical properties of lead chalcogenides PbX (X=S, Se, Te) under hydrostatic pressure, Physics B 337, 394 (2003).

F.G. Murnaghan, The compressibility of Media under Extreme Pressures, Proc. Natl. Acad. Sci. 30, 244 (1944).

M. Lach-Hab et al., Electronic structure calculations of lead chalcogenides PbS, PbSe, PbTe, J. Phys. Chem. Sol. 63, 833 (2002).

G. Allan et al., Confinement effects in PbSe quantum wells and nanocrystals, Phys. Rev. B 70, 245321 (2004).

Y.Q. Yang et al., Propagation of shock-induced chemistry in nanoenergetic material: the first micrometer, J. Appl. Phys. 95, 3687 (2004).

H. Du et al., Optical Properties of Colloidal PbSe Nanocrystals, Nono Lett. 2, 1321-1324 (2002).

B. S. Kim et al., Interdot interactions and band gap changes in CdSe nanocrystal arrays, J. Appl. Phys. 89,12 (2001).

C. Lee, Observation of pressure-induced direct-to-indirect-band gap trasition in InP nanocrystals, J. Appl. Phys. 113,5 (2000).

O. Madelung et al., Springer-Vertag, 17, 167 (1983).

* cited by examiner

Display transmitted light intensity

REAL TIME MEASUREMENT OF SHOCK PRESSURE

The United States Government has rights in this invention pursuant to Contract No. DE-AC52-06NA25396 between the United States Department National Nuclear Security Administration and the Los Alamos National Security LLC for the operation of the Los Alamos National Laboratory.

BACKGROUND OF THE INVENTION

1. Field of the Invention

The present invention relates to techniques for measuring shock pressure, and more specifically, it relates to fiber-based, optical pressure-sensing methods.

2. Description of Related Art

Shock waves are pressure waves with a very short rise time, and are produced in both impact and explosive phenomena. Dynamic experiments with shock waves require a tool to measure relatively large, rapid pressure changes.

A desirable shock pressure sensor would offer fast (sub-microsecond) response, a large dynamic range, and a non-perturbing interface that is easily adaptable to a variety of systems to be studied. In addition, because shock waves often involve high ultimate pressures that often destroy the sensor, the sensor element exposed to the shock must be inexpensive. Piezo-electric, piezo-resistive and electrical pin gauges are the most commonly used sensors for many shock experiments, but they all require electrical connections and wires which are awkward for some applications. In addition, fast movement of the wires as a result of the shock can cause spurious voltages that compromise the measurement. Finally, the wires themselves are an intrusive, complicating factor, as they can conduct heat out of the system, and can change the density and shock velocity profile of the system substantially, perturbing many types of coincident measurements of interest.

Optical methods are useful for measuring large, static pressures, with good sensitivity and large dynamic range. In the common scenario of measuring pressure inside a diamond anvil cell, a small, non-intrusive chip of ruby is placed inside the cell. An external light source, usually a low-power laser, is used to excite the ruby, and the observed fluorescence peak position indicates the pressure. Ruby fluorescence, however, takes place on the order of several microseconds, and becomes even slower as pressure increases, too slow to be useful for many shock measurement systems. Pressure-induced Raman shifts have been used in similar arrangements to indicate pressure, but Raman scattering is a weak effect, and the shift observed is fairly small. Thus, it requires either long measurement times, or extremely powerful and difficult to use laser light sources. Measurements of a microsecond or less strain the limits of technical possibility. Therefore, improved techniques for measuring shock pressure are greatly desired.

SUMMARY OF THE INVENTION

It is an object of the present invention to provide fiber-optic techniques for measuring shock pressure.

It is another object to provide fiber-based, optical pressure-sensing methods.

These and other objects will be apparent to those skilled in the art based on the teachings herein.

A fiber-based optical pressure-sensor, made using semiconductor nanocrystal quantum dots (NQDs) as the active transducing material, provides response time fast enough for shock wave measurements. The application of high pressures to many common bulk semiconductors causes a large change in the size of the band gap, as observed by optical absorbance or by conductance measurements. For example, PbSe NQDs show a strong reduction of the band gap with application of static pressure. For NQDs, the shift in band gap can be observed as a shift of the PL peak. Fiber-based, optical pressure-sensing methods would allow one to replace wires with smaller, less invasive and less conducting fibers made of glass or other transparent materials.

By observing the shift of the principal absorbance feature rather than the shift of the PL peak, still faster pressure measurements are possible. Although NQD absorbance features are broader and their measurement has lower signal-to-noise ratio than PL measurements, they also show large shifts with applied pressure. In contrast to PL efficiency, NQD absorbance properties are not sensitive to environmental effects, which allow their use in applications involving conditions such as prolonged heating or the presence of reactive chemicals.

An exemplary embodiment of the invention is provided that can be used for either absorption or emission-based measurement. For emission, a single wavelength excitation source may be preferable to the broadband light source. A flash lamp or other light source (such as a laser or light emitting diode) and collecting optic sends light into a fiber and a second fiber transmits light to a spectrometer that is linked to a streak camera or high frame rate array detector. NQDs are located in a thin layer between the two fibers and absorb light in a wavelength region that can be related to the pressure. In operation, the two fibers are embedded in a material of interest such as an explosive material. The dispersive spectrometer spreads the transmitted light out in one direction and the streak camera then takes the image of light intensity or spectrum, and sweeps it in an orthogonal direction, so that the spectral intensity can be displayed as a function of time. A CCD camera then captures the image for subsequent processing and provides a time history of the transmitted light which can then be related to the time history of the pressure. Although the pressure may destroy the fibers, the expensive part of the instrumentation can be remotely located, and only relatively inexpensive fibers are destroyed.

A faster time response is achieved by an embodiment where only the fiber core is coated with nanocrystals. A portion of the fiber cladding is removed, exposing the fiber core. Similarly, a portion of the cladding of a second fiber is removed, exposing the second fiber core. The two fiber cores are butted together and coated with a NQD sensing layer. In another embodiment, only one fiber is used, for cases in which only one side of the shock system is accessible. In this embodiment, one end of a single fiber, coated with nanocrystals, is embedded in the material of interest. The other end of the fiber is coupled to a fiber splitter. One branch from the fiber splitter is connected to a light source to excite the NQDs at the embedded end of the fiber. Emitted light generated in or at the end of the fiber will be partially coupled back down the same fiber, and can be measured by a detector coupled to the other branch that is blind, or filtered to be blind, to the excitation source.

Alternatively, the light source could be a laser at a wavelength that is absorbed by the nanocrystals and the shift in absorption frequency of the PbSe nanocrystals would cause the transmitted light to vary as a function of pressure. The optical detector would only need to be a photodiode and an oscilloscope to obtain the time history of the pressure, rather than the spectrometer, streak camera, CCD combination.

BRIEF DESCRIPTION OF THE DRAWINGS

The accompanying drawings, which are incorporated into and form part of this disclosure, illustrate embodiments of the invention and together with the description, serve to explain the principles of the invention.

DETAILED DESCRIPTION OF THE INVENTION

The invention is a fiber-based optical pressure-sensor, with response time fast enough for shock wave measurements, made using semiconductor nanocrystal quantum dots (NQDs) as the active transducing material. NQDs are very small particles of semiconductor material on the order of nanometers in size, which have unique properties due to quantum confinement effects. Most NQDs made of common semiconductor materials, such as II-VI, III-V, IV-VI and Group IV materials, demonstrate bright, size-tunable photoluminescence (PL), or fluorescence. As such, they are the subjects of current investigations for applications ranging from LEDs and lasers, to sensors and bio-labels.

Figure 1:
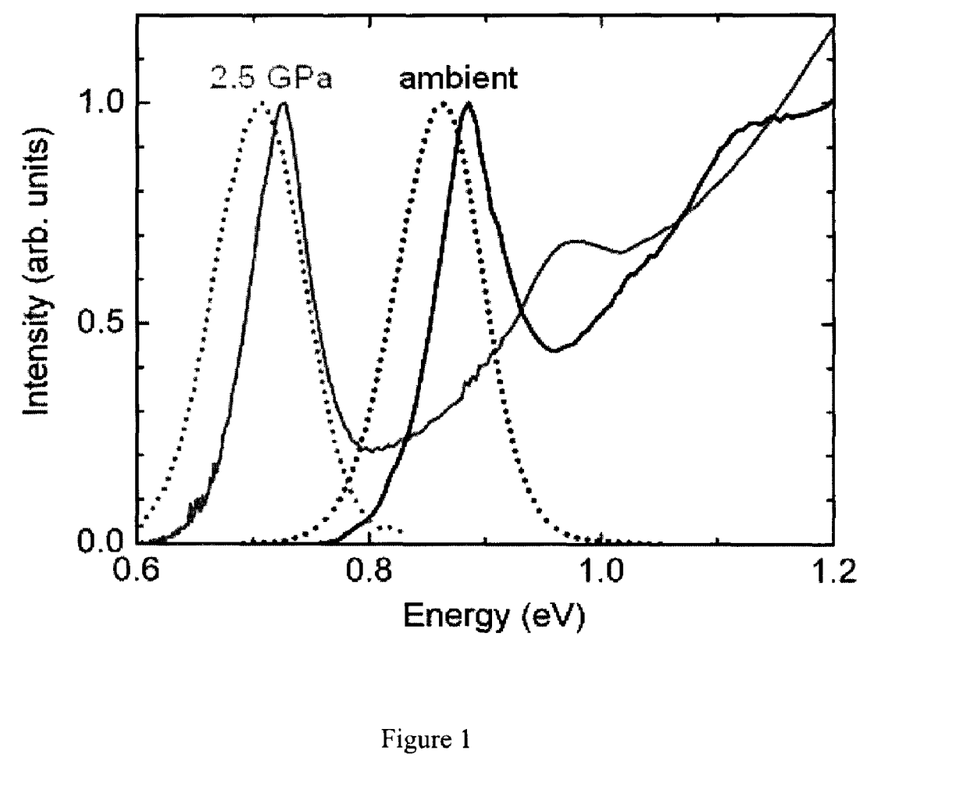
FIG. 1 shows both absorption (solid) and photoluminescence (dotted) spectra at ambient pressure and 2.5 GPa for a sample of PbSe NQDs.
Figure 2:
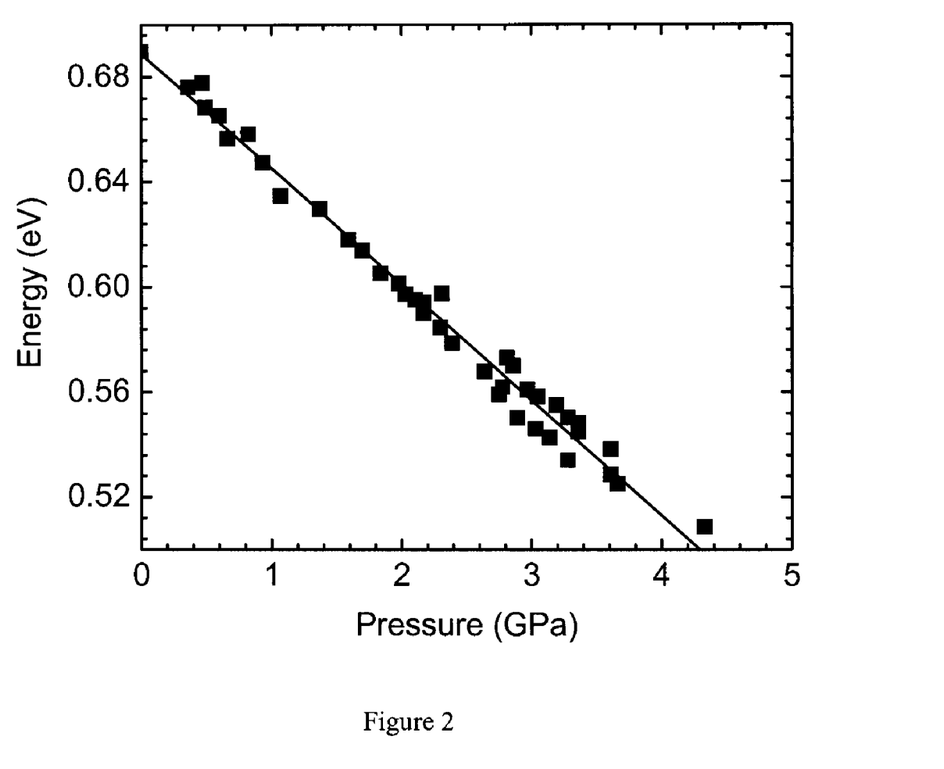
FIG. 2 shows the linear dependence of PL peak position with pressure for a sample of PbSe NQDs.

The application of high pressures to many common bulk semiconductors causes a large change in the size of the band gap, as observed by optical absorbance or by conductance measurements. The present inventors have recently demonstrated that PbSe NQDs show a strong reduction of the band gap with application of static pressure, as observed in the absorbance (solid lines) and photoluminescence (dotted lines) spectra in FIG. 1. Similarly strong shifts have been observed in NQDs of CdSe, InP, and other semiconductors, so the effect is as general for nanocrystals as it is in the bulk state. However, for NQDs, the shift in band gap can be observed as a shift of the PL peak, which is linear with pressure, and can be a few orders of magnitude larger than the shift observed in ruby or in the Raman bands of organic molecules. FIG. 2 is a plot of experimental data showing the linear dependence of PL peak position with pressure for a sample of PbSe NQDs. The pressure in this case was applied using a diamond anvil cell. The shift of −44 meV per GPa is much larger than the shifts observed in other fluorescent systems. In addition, NQDs are generally very fast emitters, with lifetimes on the order of 1-100 nanoseconds, at least thousands of times faster than ruby. Finally, NQDs are often very efficient emitters, with large absorbance cross-sections, and so produce very strong signals that can be excited and detected with very simple, inexpensive equipment.

Figure 3:
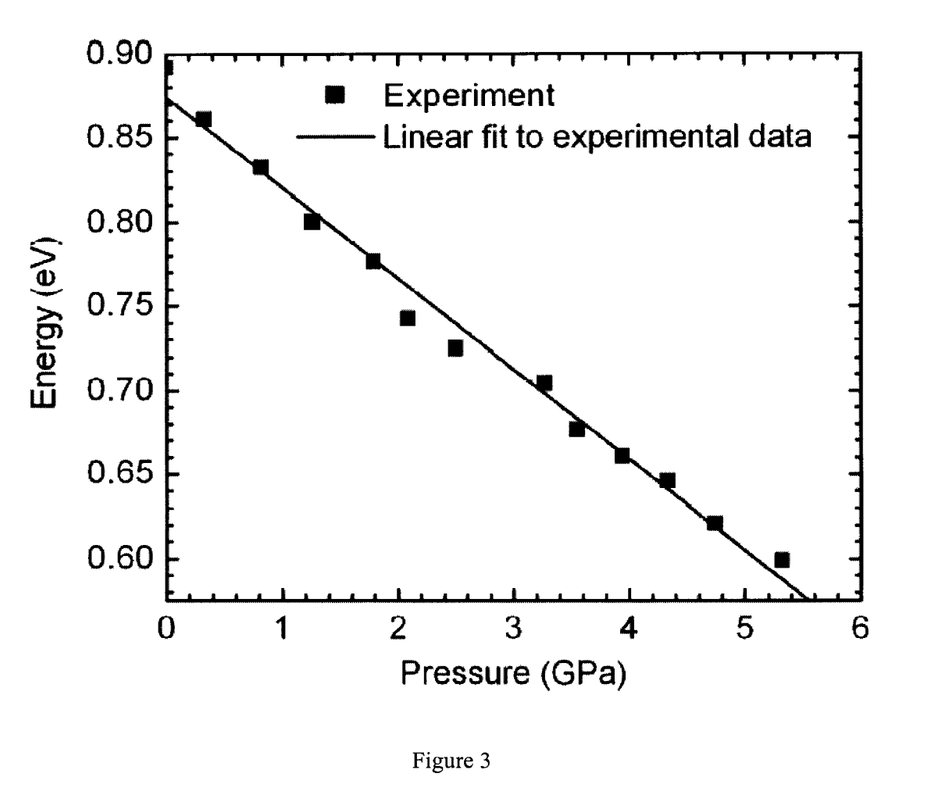
FIG. 3 shows the linear dependence of first absorption feature peak position with pressure for a sample of PbSe NQDs.

Still faster pressure measurements are possible if instead of tracking the shift of the PL peak, the shift of the principal absorbance feature is followed instead. Although NQD absorbance features are broader and their measurement has lower signal-to-noise ratio than PL measurements, as can be seen in FIG. 1, they also show large shifts with applied pressure. FIG. 3 is a plot of experimental data showing the linear dependence of principal absorption feature peak position with pressure for a sample of PbSe NQDs. Absorbance is an essentially instantaneous process, meaning as soon as the pressure wave reaches the NQDs, the absorbance shift can be observed, with response time limited only by the detector, which can be as little as $2 \times 10^{-13}$ s (using a streak camera). In addition, NQD absorbance properties are not sensitive to environmental effects, while PL efficiency often can be. Thus, for applications involving conditions that could reduce PL efficiency, such as prolonged heating or the presence of reactive chemicals, absorbance will be much more stable than PL.

Figure 4A:
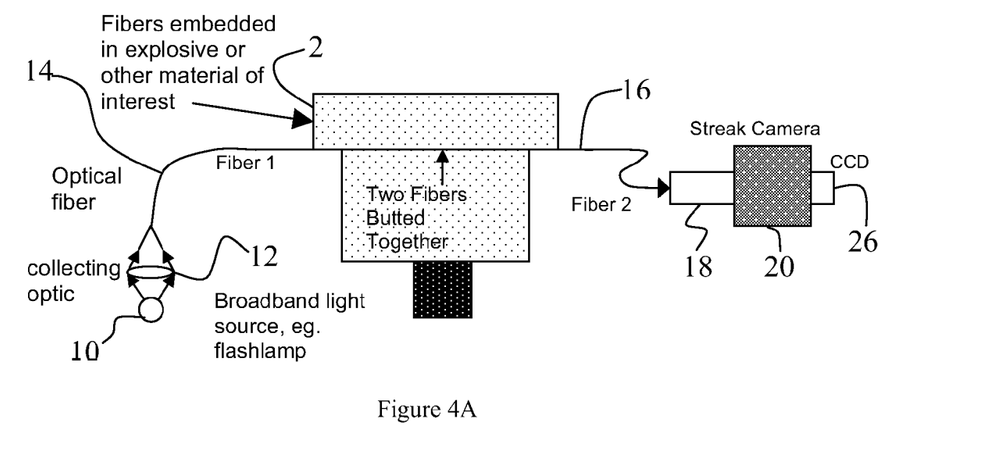
FIG. 4A shows an embodiment using nanocrystals as a pressure sensor.
Figure 4B:
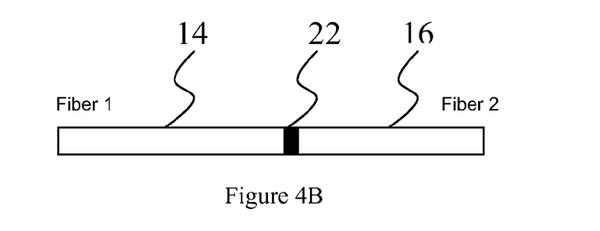
FIG. 4B shows a magnified view of the nanocrystal quantum dots between the two fibers of FIG. 4A.
Figure 4C:
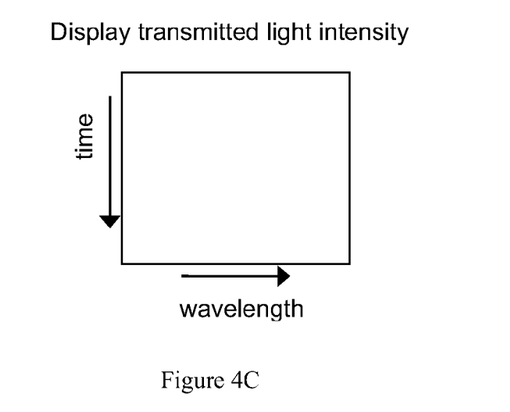
FIG. 4C shows the output of the CCD of FIG. 4A.

FIG. 4A shows an exemplary implementation of the use of nanocrystals as a pressure sensor. The scheme shown here can be used for either absorption or emission-based measurement. For emission, a single wavelength excitation source may be preferable to the broadband light source. A flash lamp 10 or other light source and collecting optic 12 sends light into fiber 14. A second fiber 16 transmits light to the spectrometer 18, which is linked to streak camera 20. FIG. 4B is a magnified view of the area where fiber 14 is butted together with fiber 16. The NQDs 22 are located in a thin layer between the two fibers and absorb light in a wavelength region that can be related to the pressure. Referring again to FIG. 4A, the two fibers are embedded in a material of interest 24, e.g., an explosive material. The dispersive spectrometer 18 of FIG. 4A spreads the transmitted light out in one direction, for instance horizontally so that the horizontal position is related to the wavelength of the transmitted light. The streak camera 20 then takes the image of light intensity or spectrum, and sweeps it in a (for instance) vertical direction, so that the spectral intensity can be displayed as a function of time. The CCD 26 camera then captures the image for subsequent processing. As shown in FIG. 4C, the CCD 26 output provides a time history of the transmitted light which can then be related to the time history of the pressure. Eventually the pressure may destroy the fibers and the transmitted light intensity will go to zero. Fortunately, the expensive part of the instrumentation can be remotely located, and only relatively inexpensive fibers are destroyed.

Figure 5A:
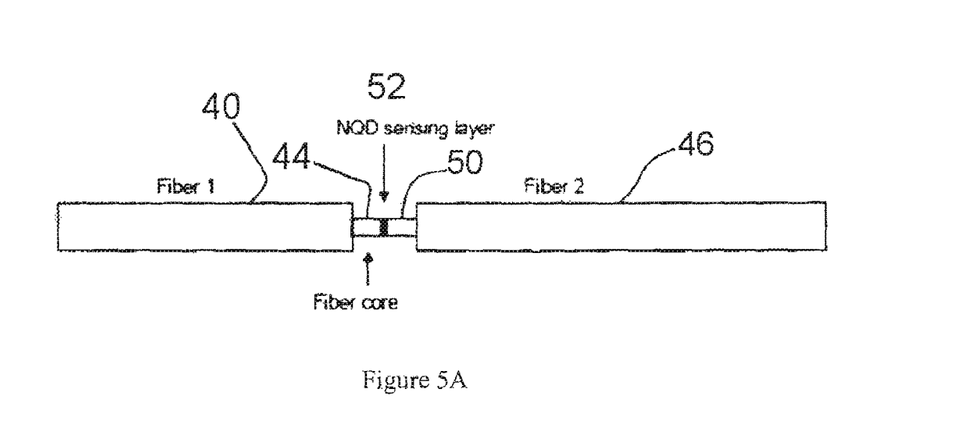
FIG. 5A shows an embodiment where only the fiber core is coated with nanocrystals so that the time response is faster.
Figure 5B:
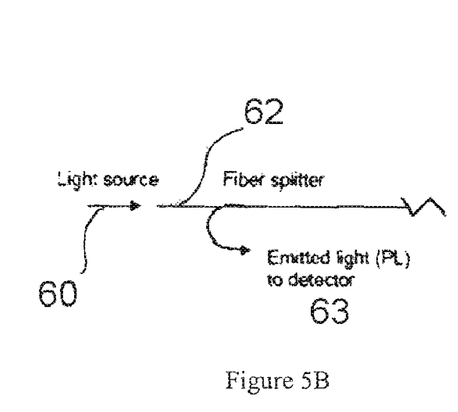
FIG. 5B shows an embodiment where only one fiber is used, for cases in which only one side of the shock system is accessible.
Figure 5C:
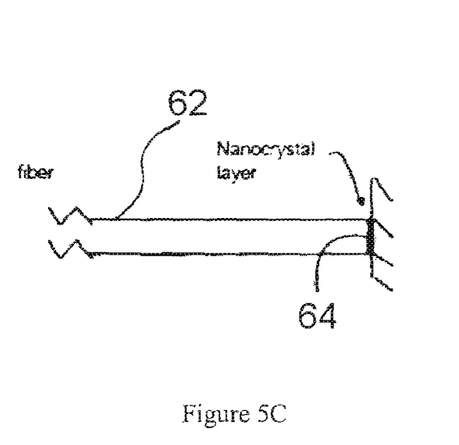
FIG. 5C shows a magnified view of the NQD-coated end of the fiber of FIG. 5B.

The time response of such a system is often important. The physical process of light absorption by the NQDs is essentially instantaneous. However, the time for the shock or pressure wave to pressurize all the nanocrystals is determined by the velocity of the pressure pulse and the size of the region at the end of the fiber. Optical fibers are usually about 100 microns in diameter; shock waves (depending on the pressure in the shock, and the material) might travel at 3 mm/microsecond or 3 micrometers per nanosecond. So the time to pressurize the whole sample would be 30 nanoseconds. By etching the fiber end to use only the optically confining part or the fiber core, the diameter could be 6 microns for a time response of two nanoseconds in the configuration shown. The thickness of the NQD layer could be 100 microns as used in measurements that produced nearly complete absorption of light at the peak absorption band. Ten percent absorption should give an adequate signal to noise ratio and the thickness of the layer could then be 10 microns for a time response of 3 nanoseconds for shocks or pressure waves traveling in that direction. FIG. 5A is an embodiment where only the fiber core is coated with nanocrystals so that the time response is faster. A portion of the cladding 40 of a fiber optic has been removed, exposing the fiber core 44. Similarly, a portion of the cladding 46 of another fiber has been removed, exposing the fiber core 50. The two fiber cores are butted together and coated with a NQD sensing layer 52. In FIG. 5B, only one fiber is used, for cases in which only one side of the shock system is accessible. In this embodiment, a light source 60 is directed into a fiber splitter 62. FIG. 5C shows a magnified view of the end of the fiber splitter of FIG. 5B. A nanocrystal layer 64 is located at the end of the fiber splitter 62. Alternately, another fiber optic can be coupled to the fiber splitter and this second fiber can include the nanocrystal layer at its end. The emitted light can be observed from branch 63 of fiber splitter 62. Emitted light generated in or at the end of the fiber will be partially coupled back down the same fiber, and can be measured by a detector that is blind, or filtered to be blind, to the excitation source.

Alternatively, the light source could be a laser at a wavelength that is absorbed by the nanocrystals and the shift in absorption frequency of the PbSe nanocrystals would cause the transmitted light to vary as a function of pressure. The optical detector would only need to be a photodiode and an oscilloscope to obtain the time history of the pressure, rather than the spectrometer, streak camera, CCD combination. This would be a much simpler system, but potentially would be susceptible to light transmission changes in the fibers appearing as pressure changes.

For shock measurements in which precise pressure measurement is more important than nanosecond time resolution, PL shifts could be measured, with nearly identical experimental apparatus. The precision gain comes from the much higher signal to noise ratio of PL measurement in general, and the narrower, better defined peak of NQD PL features, as compared to NQD absorption features (FIG. 1). In this scenario, the light source could be a laser at a wavelength that is absorbed by the nanocrystals and is invisible to the detector, and the spectrum of emitted light produced by the nanocrystals would vary as a function of pressure. In a time-resolved detection scheme using a streak camera or other fast detector (as in FIG. 4A), shock pressure could be measured. For either nanocrystal absorption or emission, static pressure could be measured as shown in FIG. 4A except that the time-resolving detector could be replaced by a variety of other detectors that simply measure the absorption of emission spectrum of the nanocrystal material.

The best measurements in most circumstances would be accomplished by using visible light-emitting NQDs, such as CdSe. This would take advantage of the availability of the many fast and sensitive detectors (e.g., CCDs) that exist for visible light detection. However, in cases in which the measurement system must be very remote from the shock site, or if very thin fibers must be used, it may be better to use infrared light-emitting NQDs, especially near 1.55 micron where fiber transparency is at a maximum. In fact, the pressure measurements performed by the present inventors were done using near-infrared emitting PbSe NQDs. In this case the CCD would have to be replaced by an infrared camera such as an Indium Antimonide array or Indium Gallium Arsenide array and the streak camera would have to be a rotating mirror streak camera. Choice of NQD material may also be based on expected background contributions, i.e., if the shock wave is expected to be accompanied by, or is produced in the presence of a different transient light source. Considering all available III/V, II/VI, and IV/VI NQDS, it is possible to choose a material that will operate in wavelength regions anywhere from the ultraviolet to the mid-infrared (roughly 270 to 4000 nm) to avoid any specific interference. Other example NQDs are formed from PbS and PbTe.

The following references are hereby incorporated herein by reference:

Colloidal synthesis of nanocrystals and nanocrystal superlattices C. B. MURRAY, S. H. Sun, W. Gaschler, H. Doyle, T. A. Betley, and C. R. Kagan, IBM J. Res. Dev. 45, 47-56 (2001)

J. M. PIETRYGA et al., Pushing the Band Gap Envelope: Mid-Infrared Emitting Colloidal PbSe Quantum Dots, Am. Chem. Soc. 126, 11752-11753 (2004)

A. P. ALIVISATOS et al., Resonance Raman scattering and optical absorption studies of CdSe microclusters at high pressure, J. Chem. Phys. 89, 5979 (1988)

J. LI et al., Deformation potentials of CdSe quantum dots, Appl. Phys. Lett. 85, 2929 (2004)

AL. L. EFROS et al., Interband absorption of light in a semiconductor sphere, Sov. Phys. Semicond. 16, 772 (1982)

F. W. WISE et al., Lead Salt Quantum Dots: the Limit of Strong Quantum Confinement, Acc. Chem. Res. 33, 773 (2000)

B. L. WEHRENBERG et al., Interband and Intraband Optical Studies of PbSe Colloidal Quantum Dots, J. Phys. Chem. B 106, 10634-10640 (2002)

R. D. SCHALLER et al., Tunable Near-Infrared Optical Gain and Amplified Spontaneous Emission Using PbSe Nanocrystals, J. Phys. Chem. B 107, 13765 (2003)

S. V. OVSYANNIKOV et al., Thermomagnetic and thermoelectric properties of semiconductors (PbTe,PbSe) at ultrahigh pressures, Physica B 344, 190 (2004)

S. V. OVSYANNIKOV et al., Semiconductor-metal transitions in lead chalcogenides at high pressure, Phys. Stat. Sol. B 235, 521 (2003)

A. JAYARAMAN, Diamond anvil cell and high-pressure physical investigations, Rev. Mod. Phys. 55, 65 (1983)

D. SCHIFERL, Temperature compensated high-temperature/high-pressure Merrill-Bassett diamond anvil cell, Rev. Sci. Instr. 58, 1316 (1987)

D. RACHED et al., Calculated band structures and optical properties of lead chalcogenides PbX (X=S, Se, Te) under hydrostatic pressure, Physica B 337, 394 (2003)

F. G. MURNAGHAN, The compressibility of Media under Extreme Pressures, Proc. Natl. Acad. Sci. 30, 244 (1944)

O. Madelung, M. Schulz, and H. Weiss, (Springer-Verlag, Berlin, 1983), Vol. 17.

M. LACH-HAB et al., Electronic structure calculations of lead chalcogenides PbS, PbSe, PbTe, J. Phys. Chem. Sol. 63, 833 (2002)

G. ALLAN et al., Confinement effects in PbSe quantum wells and nanocrystals, Phys. Rev. B 70, 245321 (2004)

Y. Q. YANG et al., Propagation of shock-induced chemistry in nanoenergetic materials: The first micrometer, J. Appl. Phys. 95, 3667 (2004)

H. DU et al., Optical Properties of Colloidal PbSe Nanocrystals, Nano Lett. 2, 1321-1324 (2002)

BOSANG S. KIM et al., Interdot interactions and band gap changes in CdSe nanocrystal arrays, JOURNAL OF APPLIED PHYSICS VOLUME 89, NUMBER 12 15 Jun. 2001

CHIEH-JU LEE, Observation of pressure-induced direct-to-indirect band gap transition in InP nanocrystals, JOURNAL OF CHEMICAL PHYSICS VOLUME 113, NUMBER 51 August 2000

Accordingly, various exemplary methods of performing the invention have been described. Pressure is detected and quantified, e.g., by positioning nanocrystal quantum dots (NQDs) proximate (operatively near) a material, wherein a shift in band gap is produced in the NQDs when the material is compressed; and observing an electromagnetic product (EMP) of the shift in band gap during compression of the material. The method includes producing data from the EMP product indicative of the amount of pressure within the material. Compressing the material is included in the method. The material can be an energetic (explosive or detonatable) material and the process of compressing the material includes exploding or detonating the material. The NQDs are sometimes embedded within the material. A first fiber optic end can be abutted to a second fiber optic end, wherein the first fiber optic end and the second fiber optic end are embedded within the material, wherein at least one of the first fiber optic end and the second fiber optic comprises a sensing layer comprising the NQDs. The sensing layer can be located between the first fiber optic end and the second fiber optic end. Positioning nanocrystal quantum dots (NQDs) adjacent to a material includes abutting a first fiber optic end core to a second fiber optic end core, wherein the first fiber optic end core and the second fiber optic end core are embedded within the material, wherein at least one of the first fiber optic end core and the second fiber optic end core comprises a sensing layer comprising the NQDs. The sensing layer can be located between the first fiber end and the second fiber end. The sensing layer can be coated onto at least one core of the first fiber optic end core and the second fiber optic end core. A fiber optic splitter used in embodiments comprises an input port, an output port and a return port, wherein the NQDs are operatively attached to the output port, wherein embedding the NQDs within the material includes embedding the output port within the material. Removing a cladding portion from the fiber optic splitter proximate the output port prior to embedding the NQDs within the material is done in embodiments. The EMP can comprise photoluminescence or absorbance. The method further comprises optically exciting the NQDs, e.g., with a single wavelength excitation source. Observing an electromagnetic product includes transmitting the EMP to a spectrometer that may also be linked to a streak camera or a detector. Spectral intensity of the EMP as a function of time is displayed. The spectrometer spreads the light product out in one direction to produce a spread light product and the streak camera then takes the image of the light intensity or spectrum of the spread light product and sweeps it in a direction orthogonal to the spread of the spread light, so that the spectral intensity can be displayed as a function of time. A CCD camera may be used for capturing an image of the spectral intensity of the EMP as a function of time. The image may be related to pressure.

The invention includes exemplary embodiments of an apparatus for sensing pressure, comprising a first fiber optic (FFO) comprising a FFO proximal end and a FFO distal end; nanocrystal quantum dots (NQDs) affixed proximate the distal end. The apparatus further comprising means for optically exciting the NQDs, where e.g., the means for optically exciting the NQDs comprises an electromagnetic radiation source (EMS) and means for aligning the EMS into the FFO proximal end. In embodiments, the apparatus further comprises a second fiber optic (SFO) comprising a SFO proximal end and a SFO distal end, wherein the SFO proximal end is abutted to the FFO distal end. Nanocrystal quantum dots (NQDs) may be affixed proximate (operatively near) to at least one of the FFO distal end and the SFO proximal end. The nanocrystal quantum dots (NQDs) may be affixed between the FFO distal end and the SFO proximal end. The SFO distal end may be operatively aligned to the spectrometer. A spectrometer output can be optically aligned with the streak camera which may be operatively connected and aligned to a CCD camera. In embodiments, the FFO comprises an unclad core portion proximate the FFO distal end. In embodiments, the FFO comprises an unclad core portion proximate the FFO distal end and wherein the SFO comprises an unclad core portion proximate the SFO proximal end. In embodiments, the FFO comprises a fiber splitter comprising the FFO proximal end, the FFO distal end and an output end. The FFO may comprise an unclad core portion proximate the FFO distal end.

The foregoing description of the invention has been presented for purposes of illustration and description and is not intended to be exhaustive or to limit the invention to the precise form disclosed. Many modifications and variations are possible in light of the above teaching. The embodiments were chosen and described to best explain the principles of the invention and its practical application to thereby enable others skilled in the art to best use the invention in various embodiments and with various modifications suited to the particular use contemplated. The scope of the invention is to be defined by the following claims.

We claim:

1. A method, comprising:
   positioning nanocrystal quantum dots (NQDs) proximate to an energetic material,
   compressing said energetic material by detonation whereby a shift in band gap is produced in said NQDs; and
   observing an electromagnetic product (EMP) of said shift in band gap during compression of said energetic material.

2. The method of claim 1, wherein observing further comprises producing and transmitting data from said EMP for measuring the amount of pressure within said energetic material.

3. The method of claim 1, wherein positioning nanocrystal quantum dots (NQDs) proximate to an energetic material alternatively includes embedding said NQDs within said material.

4. The method of claim 1, wherein positioning nanocrystal quantum dots (NQDs) proximate to an energetic material includes abutting a first fiber optic end to a second fiber optic end, wherein said first fiber optic end and said second fiber optic end are embedded within said material, wherein at least one of said first fiber optic end and said second fiber optic comprises a sensing layer comprising said NQDs.

5. The method of claim 4, wherein said sensing layer is located between said first fiber optic end and said second fiber optic end.

6. The method of claim 1, wherein positioning nanocrystal quantum dots (NQDs) proximate to an energetic material includes abutting a first fiber optic end core to a second fiber optic end core, wherein said first fiber optic end core and said second fiber optic end core are embedded within said material, wherein at least one of said first fiber optic end core and said second fiber optic end core comprises a sensing layer comprising said NQDs.

7. The method of claim 6, wherein said sensing layer is located between said first fiber end and said second fiber end.

8. The method of claim 6, wherein said sensing layer is coated onto at least one core of said first fiber optic end core and said second fiber optic end core.

9. The method of claim 3, further comprising providing a fiber optic splitter comprising an input port, an output port and a return port, wherein said NQDs are operatively attached to said output port, wherein embedding said NQDs within said energetic material includes embedding said output port within said material.

10. The method of claim 9, further comprising removing a cladding portion from said fiber optic splitter proximate said output port prior to embedding said NQDs within said energetic material.

11. The method of claim 1, wherein said EMP comprises photoluminescence.

12. The method of claim 1, wherein said EMP comprises absorbance.

13. The method of claim 1, further comprising optically exciting said NQDs.

14. The method of claim 1, further comprising optically exciting said NQDs with source selected from a group consisting of a broadband light source and a single wavelength excitation source.

15. The method of claim 1, wherein observing an electromagnetic product includes transmitting said EMP to a spectrometer.

16. A method, comprising:
positioning nanocrystal quantum dots (NQDs) proximate a material, wherein a shift in band gap is produced within said NQDs when said material is compressed;
measuring the electromagnetic product (EMP) of said shift in band gap during compression of the material by transmitting said EMP to a spectrometer linked to a streak camera; and
producing data from said EMP indicative of the amount of pressure within said material.

17. The method of claim 1, wherein observing an electromagnetic product includes transmitting said EMP to a spectrometer linked to a detector.

18. The method of claim 15, further comprising displaying a spectral intensity of said EMP as a function of time.

19. The method of claim 16, wherein said spectrometer spreads said EMP product out in one direction to produce a spread EMP and said streak camera then takes an image of light intensity or a spectrum of said spread EMP and sweeps it in a direction orthogonal to the spread of said spread EMP, so that spectral intensity can be displayed as a function of time.

20. The method of claim 18, further comprising capturing an image of said spectral intensity of said EMP as a function of time.

21. The method of claim 1, wherein the shift in band gap produced in said NQDs is measured as a shift of the photoluminescence peak which is linearly related to the amount of pressure within the energetic material.

22. An apparatus for sensing pressure, comprising:
a first fiber optic (FFO) comprising a FFO proximal end and a FFO distal end;
nanocrystal quantum dots (NQDs) affixed proximately to said FFO distal end:
an electromagnetic radiation source (EMS) for optically exciting said NQDs;
means for aligning said EMS into said FFO proximal end;
a spectrometer which is operatively aligned with said FFO distal end; and
a streak camera which is optically aligned with said spectrometer output for measuring the shift in band gap produced within said NQDs when excited.

23. The apparatus of claim 22, further comprising a second fiber optic (SFO) comprising a SFO proximal end and a SFO distal end, wherein said SFO proximal end is abutted to said FFO distal end thereby proximately affixing said NQDs to at least one of said FFO distal end and said SFO proximal end, and wherein said spectrometer is operatively aligned to the distal end of said SFO.

24. The apparatus of claim 23, wherein said nanocrystal quantum dots (NQDs) are affixed between said FFO distal end and said SFO proximal end.

25. The apparatus of claim 22, further comprising a CCD camera, wherein said streak camera is operatively connected and aligned to said CCD camera.

26. The apparatus of claim 22, wherein said FFO comprises an unclad core portion proximate said FFO distal end.

27. The apparatus of claim 23, wherein said FFO comprises an unclad core portion proximate said FFO distal end and wherein said SFO comprises an unclad core portion proximate said SFO proximal end.

28. An apparatus for sensing pressure, comprising:
a fiber optic splitter having an input port, an output port and a return port,
nanocrystal quantum dots (NQDs) affixed proximately to said output port,
a material into which is embedded said output port whereby a shift in band gap is produced in said NQDs by the shock of said material;
a light source for directing light into the input port of said fiber optic splitter for exciting the NQDs located at the output port; and
a detector located at the return port of said splitter, for receiving emitted light generated at the output port during the shock of said material and, which is coupled back down the fiber from the output port to the return port, for measuring said shift in band gap by filtering out the excitation source light.

29. The apparatus of claim 28, wherein said fiber optic splitter comprises an unclad core portion proximate said splitter output port for acceptance of an NQD coating.

30. The apparatus of claim 28, wherein said detector comprises:
a spectrometer which is operatively aligned with said splitter return port; and
a streak camera which is optically aligned with said spectrometer output for measuring said shift in band gap.

31. A method for sensing pressure comprising:
positioning nanocrystal quantum dots (NQDs) on one unclad end of a single optical fiber proximate to a material,
directing a laser light at a wavelength that is absorbed by the NQDs into the opposite end of said optical fiber,
producing a shift in absorption frequency in said NQDs when said material is shocked; and
optically detecting the variance in light transmitted by said NQDs during shock through the use of a photodiode and oscilloscope.

32. The method of claim 31, wherein said NQDs comprise PbSe nanocrystal quantum dots.

* * * * *